US010480370B2

(12) United States Patent
Romanato

(10) Patent No.: US 10,480,370 B2
(45) Date of Patent: Nov. 19, 2019

(54) DUAL POWER SUPPLY FOR ECAT AND CONTROL

(71) Applicant: GM GLOBAL TECHNOLOGY OPERATIONS LLC, Detroit, MI (US)

(72) Inventor: Roberto Romanato, Settimo Torinese (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 48 days.

(21) Appl. No.: 15/682,629

(22) Filed: Aug. 22, 2017

(65) Prior Publication Data

US 2019/0063288 A1    Feb. 28, 2019

(51) Int. Cl.
*F01N 3/20* (2006.01)
*F01N 9/00* (2006.01)

(52) U.S. Cl.
CPC ......... *F01N 3/2026* (2013.01); *F01N 3/2013* (2013.01); *F01N 9/00* (2013.01); *F01N 2240/16* (2013.01); *F01N 2900/0418* (2013.01)

(58) Field of Classification Search
CPC ........ F01N 3/2013; F01N 3/2026; F01N 9/00; F01N 2240/16
See application file for complete search history.

(56) References Cited

U.S. PATENT DOCUMENTS

2012/0004801 A1\*    1/2012   Watanabe ............. F01N 3/2026
                                              701/22

OTHER PUBLICATIONS

"DC-DC Converter Types like Buck Converter and Boost Converter," ELPROCUS, archived as early as Nov. 14, 2013 (Year: 2013).\*

\* cited by examiner

*Primary Examiner* — Audrey K Bradley
(74) *Attorney, Agent, or Firm* — Lorenz & Kopf, LLP

(57) ABSTRACT

Methods and apparatuses are provided for controlling an electrically-heated catalyst system of a vehicle. A method includes that a power request is received. The method includes determining whether to use a high power voltage net or a low power voltage net based upon the received power request. The electrically-heated catalyst system is controlled using the determined high power voltage net or the low power voltage net.

20 Claims, 5 Drawing Sheets

DUAL POWER SUPPLY FOR ECAT AND CONTROL

TECHNICAL FIELD

The present disclosure generally relates to electrically-heated catalyst systems, and more particularly relates to controlling the supply of electric power to an electrically-heated catalyst system.

BACKGROUND

This section provides background information related to the present disclosure which is not necessarily prior art.

Generally, an electrically-heated catalyst (designated as an "eCAT" hereinafter) may be used to purify the exhaust gas of the internal combustion engine, in which the eCAT may be heated by electric power from a battery. With this approach, eCAT can be used to provide a method to increase gas temperatures directly in the exhaust catalyst. The energy input can be tailored according to the component need.

However, current approaches experience eCAT control problems that result in ripple currents. The ripple current affects drivability because of ripple torque effect. Accordingly, it is desirable to have different power levels for eCAT control. In addition, it is desirable to effect a switching control approach that reduces the impact on the electrical network. Furthermore, other desirable features and characteristics of the present invention will become apparent from the subsequent detailed description and the appended claims, taken in conjunction with the accompanying drawings and the foregoing technical field and background.

SUMMARY

In one embodiment, a method is provided for controlling electric power to an electrically-heated catalyst system of a vehicle. A power request is received that is related to operation of the electrically-heated catalyst system. There is a determination as to whether to use a high power voltage net or a low power voltage net based upon the received power request. The electrically-heated catalyst system is controlled using the determined high power voltage net or the low power voltage net.

The method can include that a dual power supply comprises the high power voltage net and the low power voltage net.

The method can include that the dual power supply comprises switches for controlling whether the high power voltage net and the low power voltage net is used in response to the received power request.

The method can include that the power net helps reduce the impact on the electrical network.

The method can include that the power net helps reduce the impact on drivability due to a ripple current.

The method can include that the high voltage net is used for power requests greater than what the low voltage net can provide.

The method can include that the low voltage net is used for power requests that can be handled by the low voltage net.

The method can include that the low voltage net is used for power requests that can be handled by the low voltage net.

The method can include that when the high voltage net is used, then the first PWM value is set to zero and the second PWM value for controlling the electrically-heated catalyst system is set to:

$$PWM_2 = \sqrt{\frac{P_{req} * R}{V_H}}$$

where when the low voltage net is used, then the second PWM value is set to zero and the first PWM value for is set to:

$$PWM_1 = \sqrt{\frac{P_{req} * R}{V_L}}$$

where the Preq is value of the requested power value; R is the resistance value of heater component of the electrically-heated catalyst system; VL is the voltage value of the low power level net; and VH is the voltage value of the high power level net.

The method can include that a third power voltage net is used with the high power voltage net and the low power voltage net for controlling the electrically-heated catalyst system.

In one embodiment, a system is provided for controlling electric power to an electrically-heated catalyst system of a vehicle. The system includes a high power voltage net and a low power voltage net for supplying control to the electrically-heated catalyst system. The system includes switches associated with the high power voltage net and the low power voltage net. The switches are operated in response to determining whether to use a high power voltage net or a low power voltage net based upon the received power request. The electrically-heated catalyst system is controlled using the determined high power voltage net or the low power voltage net.

The system includes that a dual power supply comprises the high power voltage net and the low power voltage net.

The system includes that the dual power supply comprises switches for controlling whether the high power voltage net and the low power voltage net is used in response to the received power request.

The system includes that the power net helps reduce the impact on the electrical network.

The system includes that the power net helps reduce the impact on drivability due to a ripple current.

The system includes that the high voltage net is used for power requests greater than what the low voltage net can provide.

The system includes that the low voltage net is used for power requests that can be handled by the low voltage net.

The system includes that the low voltage net is used for power requests that can be handled by the low voltage net.

The system includes that when the high voltage net is used, then the first PWM value is set to zero and the second PWM value for controlling the electrically-heated catalyst system is set to:

$$PWM_2 = \sqrt{\frac{P_{req} * R}{V_H}}$$

where when the low voltage net is used, then the second PWM value is set to zero and the first PWM value for is set to:

$$PWM_1 = \sqrt{\frac{P_{req} * R}{V_L}}$$

where the Preq is value of the requested power value; R is a resistance value, VL is the voltage value of the low power level net, and VH is the voltage value of the high power level net.

In one embodiment, a vehicle is provided that includes an electrically-heated catalyst system and a high power voltage net and a low power voltage net for supplying control to the electrically-heated catalyst system. Switches associated with the high power voltage net and the second power voltage net. The switches are operated in response to determining whether to use a high power voltage net or a low power voltage net based upon the received power request. The electrically-heated catalyst system is controlled using the determined high power voltage net or the low power voltage net.

DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit the invention disclosed herein or the application and uses of the invention disclosed herein. Furthermore, there is no intention to be bound by any principle or theory, whether expressed or implied, presented in the preceding technical field, background, summary or the following detailed description, unless explicitly recited as claimed subject matter.

Figure 1:
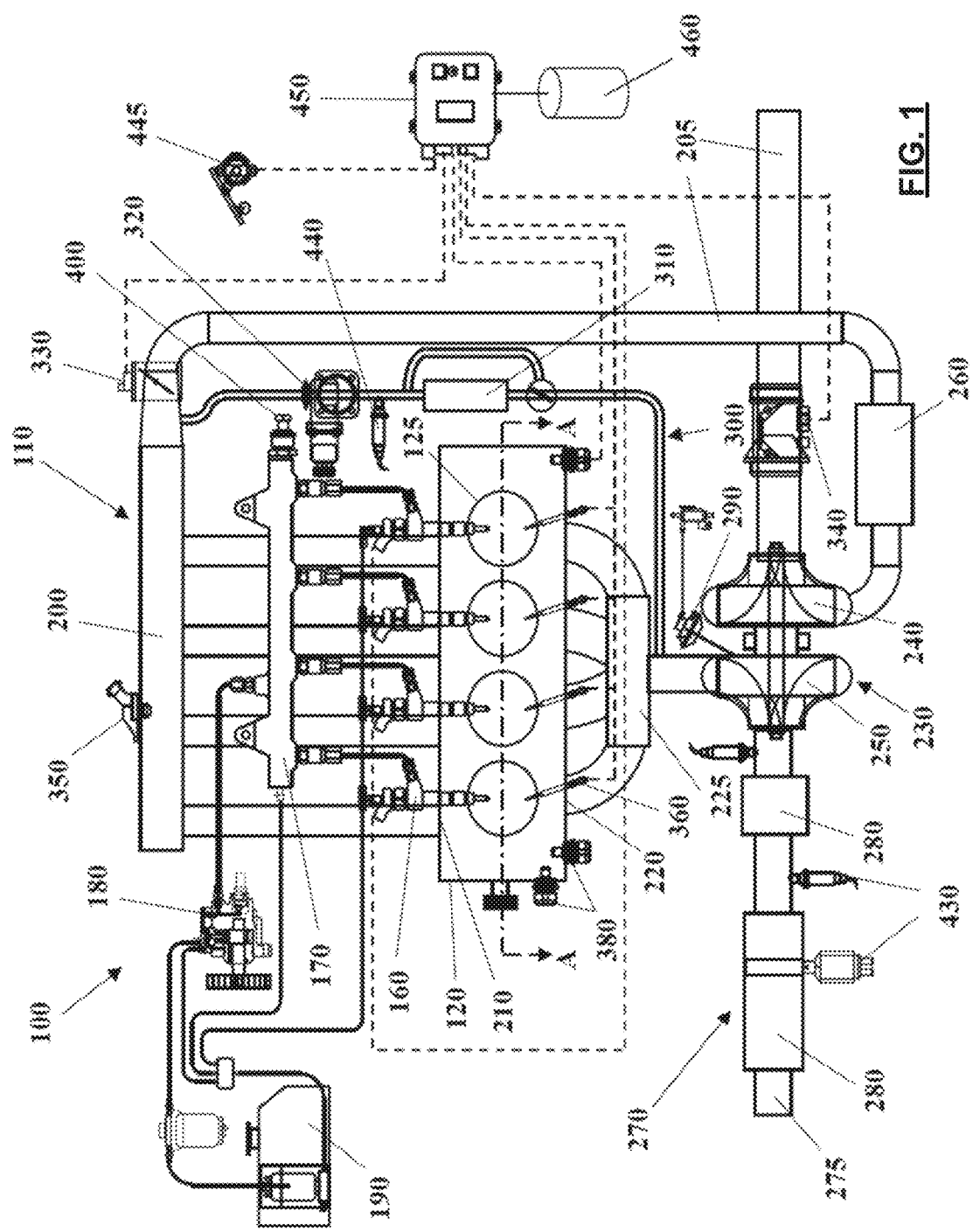
FIG. 1 schematically shows an automotive system according to an embodiment of the present disclosure.
Figure 2:
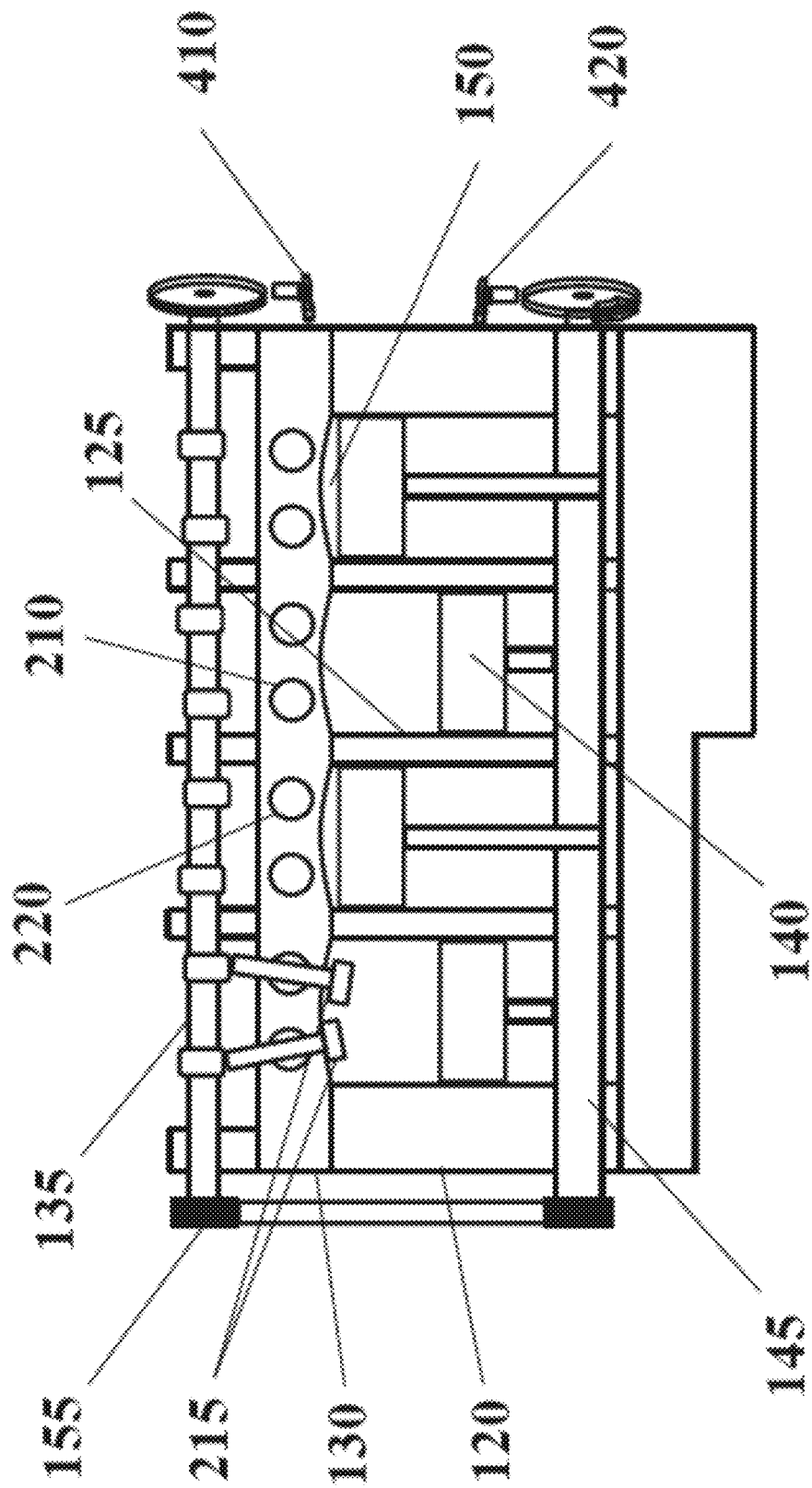
FIG. 2 is the section A-A of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an aftertreatment system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The aftertreatment system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters, such as a Selective Catalytic Reduction on Filter (SCRF) 500.

The SCRF 500 may be associated with a temperature sensor upstream of the SCRF 500 and temperature sensor downstream of the SCRF 560.

Other embodiments may include an high pressure exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

Other embodiments may include also a low pressure exhaust gas recirculation (EGR) system.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
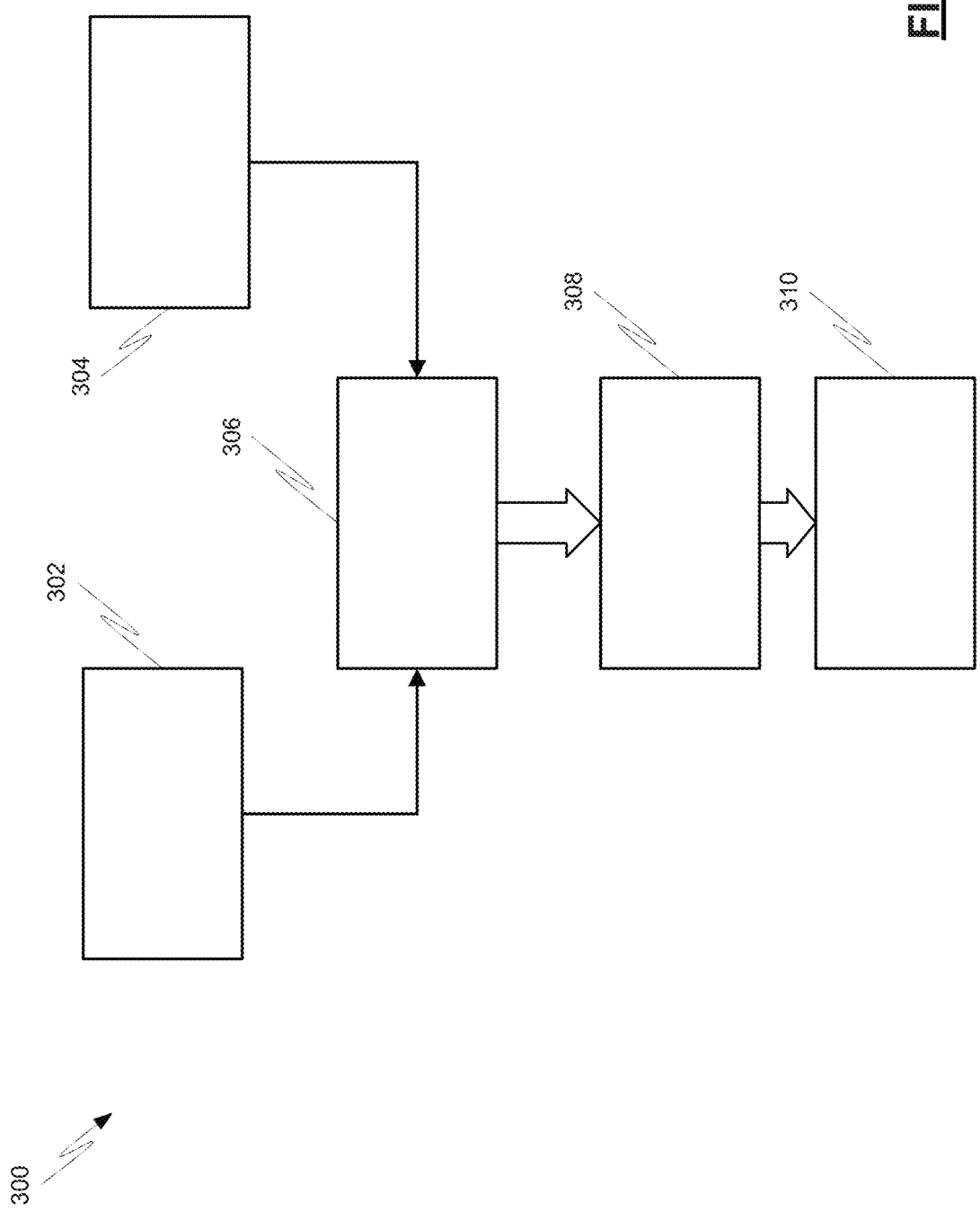
FIG. 3 is block diagram depicting an example of a dual power level system according to an embodiment of the present disclosure.

FIG. 3 depicts at 300 a dual power net of a hybrid application to improve control of the eCAT 310. The dual power net 300 connects the eCAT 310 to a low voltage net 302 and a high voltage net 304. Switches 306 open and close in order to use the low voltage net 302 or the high voltage net 304 based upon a power request for controlling the eCAT 310.

As an example, the high voltage net 304 is used for power requests greater than what the low voltage net 302 can provide. The low voltage net 302 is used for power requests that can be handled by the low voltage net 302. This dual power net 300 helps reduce the impact on the electrical network and the impact on drivability due to transmitting the ripple current for a ripple torque.

Figure 4:
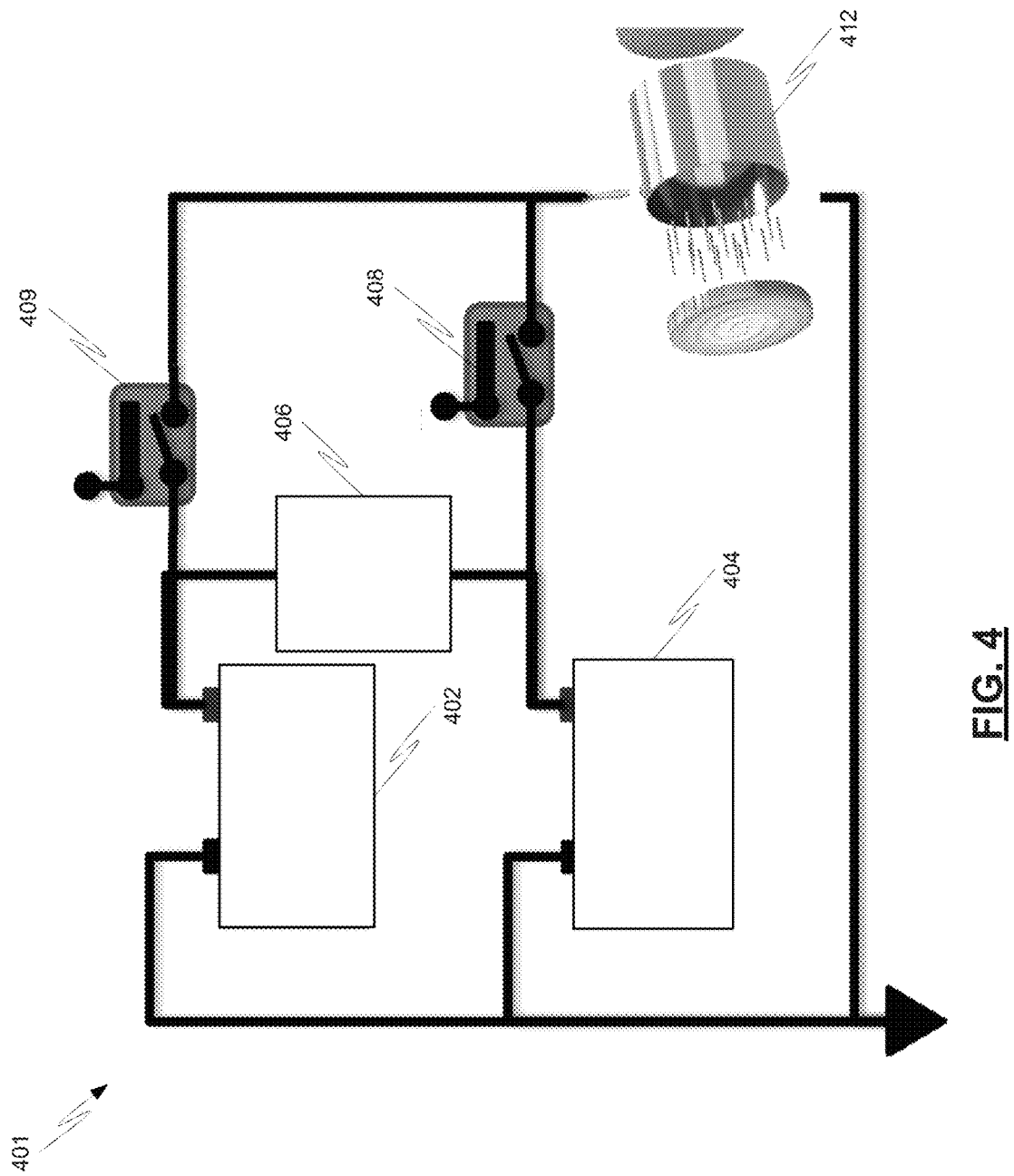
FIG. 4 is a schematic depicting multiple power levels and switches for eCAT control according to an embodiment of the present disclosure.

FIG. 4 depicts at 401 the use of two voltage levels in a hybrid application. In this example, the dual power net 401 may have a low-power net, such as from a 12 volt battery 404, and a high power net, such as from a 48 volt battery 402. In the system 401, both power supplies 402 and 404 are used to supply the power for the electrical catalyst converter as shown at 412. The operation of the dual power net 401 uses the two voltage levels to achieve PWM (pulse-width modulation) that improves control of the eCAT. A DC/DC converter is provided within the net as shown at 406.

Switches 408 and 409 are used to enable the high power net or low power net for controlling the eCAT. More specifically, when the first switch 408 is closed, the low power net is used for eCAT control. When the second switch 409 is closed, the high power net is used. The switches 408 and 409 can be operated to provide the control shown in FIG. 5.

Figure 5:
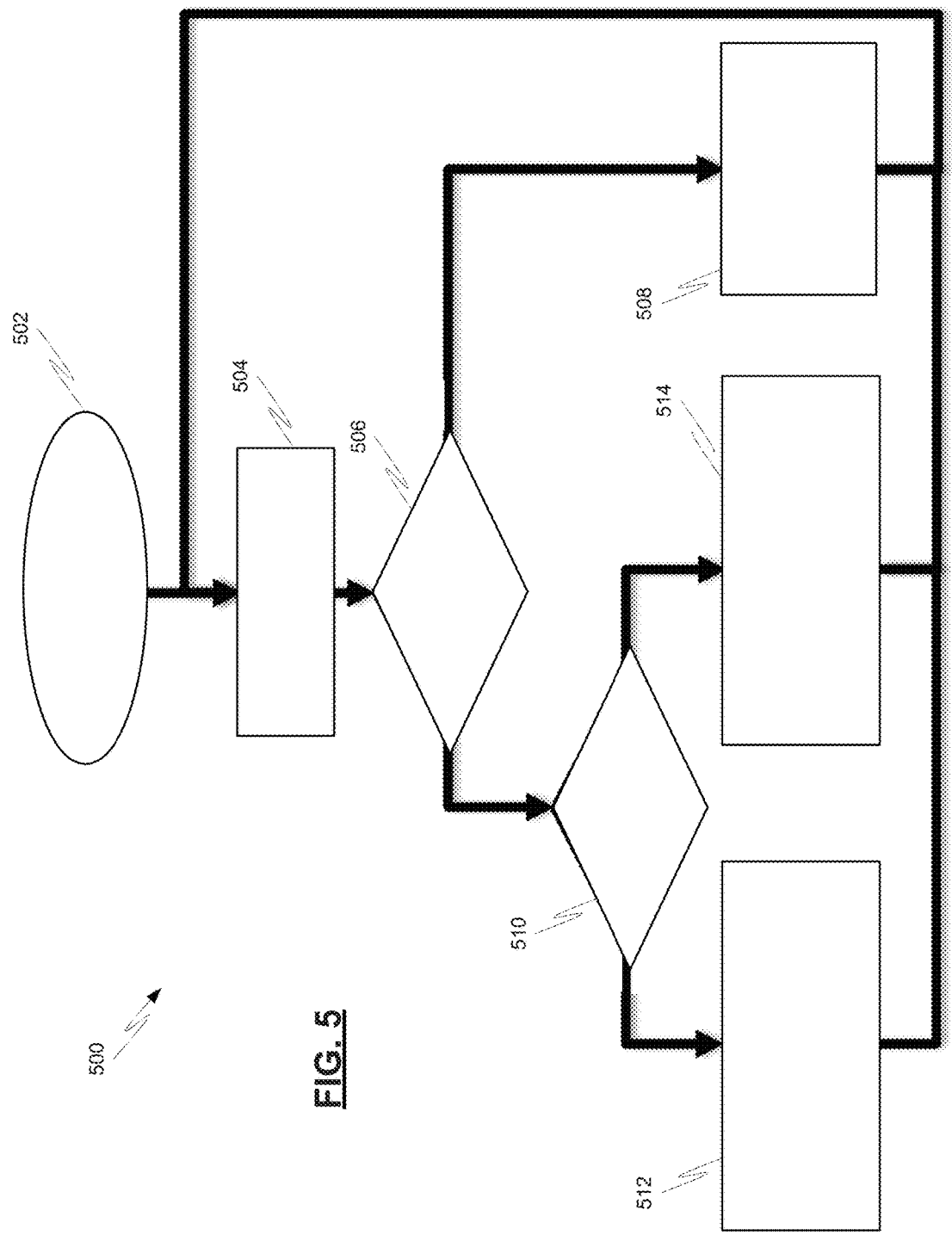
FIG. 5 is a flowchart for depicting an operational scenario for eCAT according to an embodiment of the present disclosure.

FIG. 5 depicts at 500 an operational scenario where the task is performed at a set interval (e.g., every 1000 milliseconds) as shown at 502. At process block 504, a power request is provided. If the power request is not greater than zero as determined at decision branch 506, then the first and second PWM values are set to zero and processing continues at process block 504.

If the power request is greater than zero as determined at decision branch 506, then decision branch 510 examines whether the power request is greater than the power level of the low voltage net. In this operational scenario, the power level of the low voltage is 12 volts. Accordingly, if the power request is greater than what the 12 volt net can provide in this operational scenario, then the first PWM value is set to zero and the second PWM value is set to:

$$PWM_2 = \sqrt{\frac{P_{req} * R}{V_H}}$$

where:
$P_{req}$ is the power request value;
R is the resistance value; and
$V_H$ is the voltage value of the high power level net.

In this operational scenario, the value in the above equation for $V_H$ is 48 volts. If decision branch 510 determines that the power request is not greater than the power level of the low voltage net, then the second PWM value is set to zero, and the first PWM value is set to:

$$PWM_1 = \sqrt{\frac{P_{req} * R}{V_L}}$$

where:
$P_{req}$ is the power request value;
R is the resistance value; and
$V_L$ is the voltage value of the low power level net.

In this operational scenario, the value of $V_H$ is 12 volts. Utilization of the lower voltage source provides lower power and keeps the PWM close to 100%. After process block 510, processing returns to process block 504 for another iteration.

The dual power operational scenario of FIG. 5 reduces the impact on electrical net by reducing the RMS (root mean square) current that may be caused by an aging battery as well as the impact on drivability with transmitting the ripple current in a ripple torque.

It should be understood that more than two power levels can be used to control eCAT. For example, if three different power levels are available, then the different power levels can be used to more finely tune eCAT control to meet the power request. In this situation, an additional switch can be used for controlling the third power level.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling electric power to an electrically-heated catalyst system of a vehicle, comprising:
    receiving a power request value related to operation of the electrically-heated catalyst system;
    determining whether to use a high power voltage net or a low power voltage net based upon the received power request value; and
    controlling the electrically-heated catalyst system using the determined high power voltage net or the low power voltage net;
    wherein when the high power voltage net is used, then a first PWM value is set to zero and a second PWM value for controlling the electrically-heated catalyst system is set to a value that is based upon the requested power value, a resistance value, and a voltage value of the high power voltage net:
    wherein when the low power voltage net is used, then the second PWM value is set to zero and the first PWM value for is set to a value that is based upon the requested power value, the resistance value, and a voltage value of the low power voltage net.

2. The method of claim 1, wherein a dual power supply comprises the high power voltage net and the low power voltage net.

3. The method of claim 2, wherein the dual power supply comprises switches for controlling whether the high power voltage net or the low power voltage net is used in response to the received power request value.

4. The method of claim 3, wherein the high power voltage net and the low power voltage net help reduce the impact on an electrical network.

5. The method of claim 3, wherein the high power voltage net and the low power voltage net help reduce the impact on drivability due to a ripple current.

6. The method of claim 1, wherein the high power voltage net is used for power requests greater than what the low power voltage net can provide.

7. The method of claim 6, wherein the low power voltage net is used for power requests that can be handled by the low power voltage net.

8. The method of claim 7, wherein the high power voltage net is used for power requests that can be handled by the high power voltage net.

9. The method of claim 8, wherein when the high power voltage net is used, then the first PWM value is set to zero and the second PWM value for controlling the electrically-heated catalyst system is set to:

$$PWM_2 = \sqrt{\frac{P_{req} * R}{V_H}}$$

wherein when the low power voltage net is used, then the second PWM value is set to zero and the first PWM value for is set to:

$$PWM_1 = \sqrt{\frac{P_{req} * R}{V_L}}$$

wherein $P_{req}$ is value of the requested power value; R is the resistance value, $V_L$ is the voltage value of the low power voltage net, and $V_H$ is the voltage value of the high power voltage net.

10. The method of claim 1, wherein a third power voltage net is used with the high power voltage net and the low power voltage net for controlling the electrically-heated catalyst system.

11. A system for controlling electric power to an electrically-heated catalyst system of a vehicle, comprising:
    a high power voltage net and a low power voltage net for supplying control to the electrically-heated catalyst system;
    switches associated with the high power voltage net and the low power voltage net;
    wherein the switches are operated in response to determining whether to use the high power voltage net or the low power voltage net based upon a received power request value; and
    wherein the electrically-heated catalyst system is controlled using the determined high power voltage net or the low power voltage net;
    wherein when the high power voltage net is used, then a first PWM value is set to zero and a second PWM value for controlling the electrically-heated catalyst system is set to a value that is based upon the requested power value, a resistance value, and a voltage value of the high power voltage net:
    wherein when the low power voltage net is used, then the second PWM value is set to zero and the first PWM value for is set to a value that is based upon the requested power value, the resistance value, and a voltage value of the low power voltage net.

12. The system of claim 11, wherein a dual power supply comprises the high power voltage net and the low power voltage net.

13. The system of claim 12, wherein the dual power supply uses the switches for controlling whether the high power voltage net or the low power voltage net is used in response to the received power request value.

14. The system of claim 13, wherein the high power voltage net and the low power voltage net help reduce the impact on an electrical network.

15. The system of claim 13, wherein the high power voltage net and the low power voltage net help reduce the impact on drivability due to a ripple current.

16. The system of claim 11, wherein the high power voltage net is used for power requests greater than what the low power voltage net can provide.

17. The system of claim 16, wherein the low power voltage net is used for power requests that can be handled by the low power voltage net.

18. The system of claim 17, wherein the high power voltage net is used for power requests that can be handled by the high power voltage net.

19. The system of claim 18, wherein when the high power voltage net is used, then the first PWM value is set to zero and the second PWM value for controlling the electrically-heated catalyst system is set to:

$$PWM_2 = \sqrt{\frac{P_{req} * R}{V_H}}$$

wherein when the low power voltage net is used, then the second PWM value is set to zero and the first PWM value for is set to:

$$PWM_1 = \sqrt{\frac{P_{req} * R}{V_L}}$$

wherein $P_{req}$ is value of the requested power value; R is the resistance value, $V_L$ is the voltage value of the low power voltage net, and $V_H$ is the voltage value of the high power voltage net.

20. A vehicle, comprising:
an electrically-heated catalyst system;
a high power voltage net and a low power voltage net for supplying control to the electrically-heated catalyst system; and
switches associated with the high power voltage net and the low power voltage net;
wherein the switches are operated in response to determining whether to use the high power voltage net or the low power voltage net based upon a received power request value;
wherein the electrically-heated catalyst system is controlled using the determined high power voltage net or the low power voltage net;
wherein when the high power voltage net is used, then a first PWM value is set to zero and a second PWM value for controlling the electrically-heated catalyst system is set to a value that is based upon the requested power value, a resistance value, and a voltage value of the high power voltage net;
wherein when the low power voltage net is used, then the second PWM value is set to zero and the first PWM value for is set to a value that is based upon the requested power value, the resistance value, and a voltage value of the low power voltage net.

* * * * *